United States Patent [19]

Katzke

[11] 3,747,282

[45] July 24, 1973

[54] APPARATUS FOR POLISHING WAFERS

[76] Inventor: Ernest F. Katzke, 531 Miller Rd., Des Plaines, Ill. 60016

[22] Filed: Nov. 29, 1971

[21] Appl. No.: 202,965

[52] U.S. Cl. .......................... 51/235, 269/21, 279/3
[51] Int. Cl. .......................................... B24b 47/00
[58] Field of Search .................. 51/235, 131; 279/3; 269/21

[56] References Cited

UNITED STATES PATENTS

| | | | |
|---|---|---|---|
| 2,405,417 | 8/1946 | Fruth | 51/145 T |
| 3,627,338 | 12/1971 | Thompson | 51/235 X |

*Primary Examiner*—Harold D. Whitehead
*Assistant Examiner*—Nicholas P. Godici
*Attorney*—Charles F. Voytech

[57] ABSTRACT

An improved vacuum chuck for holding a thin fragile workpiece, such as a silicon wafer used as an electronic component, as the workpiece is being polished. The improved chuck has a removable and replaceable ring surrounding the workpiece to hold the workpiece in the event of an accidental loss of vacuum, and the chuck is grooved to distribute the differential pressure across the wafer over the entire wafer to avoid distortion due to localized pressure differences. The increased holding power of the chuck permits the use of higher downward pressures on the workpiece which speeds the polishing action both by increased abrasion and by increased chemical erosion which is accelerated by the higher heat of friction.

3 Claims, 5 Drawing Figures

APPARATUS FOR POLISHING WAFERS

This invention relates to apparatus and method for polishing thin fragile silicon wafers such as are used as electronic components.

The polishing of wafers is presently done on flat holders to which the wafers are adhered by melted wax. Since waxes satisfactory for this purpose have a relatively low melting point, it is possible that the friction developed between the wafers and the polishing disc or wheel will create enough heat to soften the wax and loosen the wafers. Thus a load of wafers on a holder may be lost, to the detriment not only of the wafers that are broken or scratched as they leave the holder, but to the time required to clean the holder and machine, and reload the holder.

It has been proposed to avoid the build-up of heat in the workpiece holder by cooling the holder while the polishing operation is in progress. The polishing operation, however, produces, as an ancillary operation, a chemical reaction between the workpiece and the polishing compound which disintegrates the surface of the workpiece, thus accelerating the polishing process over and above that effected by abrasion alone. This chemical reaction increases with an increase in temperature, so that cooling the workpiece holder slows down the polishing process and hence should be avoided.

It has also been proposed to eliminate the wax as a wafer-holding medium and to use a form of vacuum chuck instead. Such vacuum chuck holders are disclosed in H. F. Fruth U.S. Pat. No. 2,405,417 and Boettcher et al U.S. Pat. Nos. 3,579,916 and 3,579,917. None of these patents, however, take full advantage of the holding power available in the vacuum chuck since, if full vacuum is applied to the wafer, the latter is distorted over the opening communicating with the source of vacuum and produces a "dimple" in the wafer surface. Since the desirable properties of the wafer depend upon the conformance of the wafer to a predetermined uniform thickness and flatness, the "dimple" can result in a defective wafer. The differential pressure across the wafer must therefore be reduced to the point where "dimpling" is negligible which, in turn, makes necessary a reduction in the pressure exerted upon the holder and a reduction in the heat created in the polishing operation. The latter results in a diminished chemical polishing action.

An object of this invention is to provide a vacuum chuck form of holder which distributes the differential pressure across a wafer to such an extent that no distortion is created in the shape of the wafer during the polishing operation despite the presence of heavy pressure on the holder to speed the polishing operation.

Another object of this invention is to provide a vacuum chuck form of holder which has a serrated area over which a wafer is placed, the serrated area being in communication with a source of vacuum, and a replaceable ring surrounding the serrated area and wafer to hold the wafer against movement with the polishing wheel in the event of a loss of vacuum.

These and other objects of this invention will become apparent from the following description of a preferred embodiment of the invention when taken together with the accompanying drawings in which FIG. 1 is a cross section through a wafer and a fragment of the fixture in inverted position showing the wafer holding means;

The increased holding ability provided by the fixture of this invention produces a special and unobvious result on the speed at which a satisfactory polish can be produced on a wafer. Whereas downward pressure on the fixture in prior designs of fixtures was limited either by the low holding power in the case of the vacuum fixtures or by the heat generated in the polishing operation, as in the wax-adhered type of fixture, the present fixture permits not only the application of greater pressure to speed the physical abrasion of the wafer surface, but the application of heat to the polishing compound if desired to increase the chemical eroding action which takes place between the silicon wafer and the compound and thus further reduce the polishing time for a wafer.

The fixture of this invention distributes the vacuum-created differential pressure over a maximum area of the wafer. In prior designs, the vacuum was introduced behind the wafer through a central opening, or possibly through a series of openings, making the total area of the wafer exposed to vacuum one-third or one-fourth of the wafer area. In contrast, the present fixture provides five times as much wafer area subject to vacuum as the area of the wafer supported. By distributing the vacuum pressure evenly over a maximum part of the area of the wafer, the greatest total holding force is created upon the wafer which will ensure that at the stage of highest polish where the frictional forces are the greatest, ample holding force is available to prevent the wafer from being swept off the fixture by the polishing wheel. The even distribution of pressure is accomplished by keeping the unsupported portion of the wafer to the then allowable limits of the bending stresses imposed upon the wafer by the vacuum such that no distortion is created on the polished wafer surface.

Thus in its preferred form this invention comprises a fixture for holding silicon wafers while they are being polished, the holding means being a fixture producing a differential pressure across the wafer, the differential pressure being created by a vacuum introduced behind the wafer through a series of concentric grooves in the fixture exposed to the vacuum. The concentric grooves are interconnected by radial grooves which in turn connect with a central opening leading to the source of vacuum.

The wafers to be polished will vary in thickness from wafer to wafer, but they are generally in the range of from three to eight thousandths of an inch thick and will be from one and one-quarter to one and one-half inches in diameter.

Figure 5:
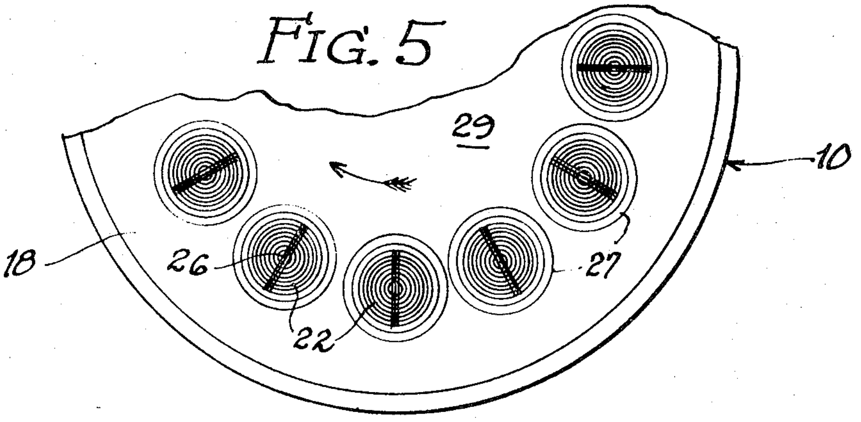
FIG. 5 is a plan view of the fixture showing the arrangement of wafer-holding stations thereon.

It is contemplated that the fixture will be able to hold a number of wafers to be polished at a time and hence in the preferred form illustrated in the drawings accompanying this specification, the fixture is circular in outline as shown at 10 in FIG. 5 and is arranged to polish 12 wafers in a circular array on the bottom surface of the fixture. Said fixture 10 is supported by an anti-friction bearing 11 from a spindle 12 rigidly supported in a frame member 13 overhanging the wheel 14 of the polishing machine. The surface 15 of wheel 14 is of such material as to hold a suitable polishing compound which is spread over such surface and serves to create the desired polish upon the wafers held thereon. Wheel 14 is preferably a rotating disc the upper surface 16 of which is perfectly flat and smooth such that its character is transmitted through the material 15 to the wafers being polished.

Figures 1, 2, 3, 4:
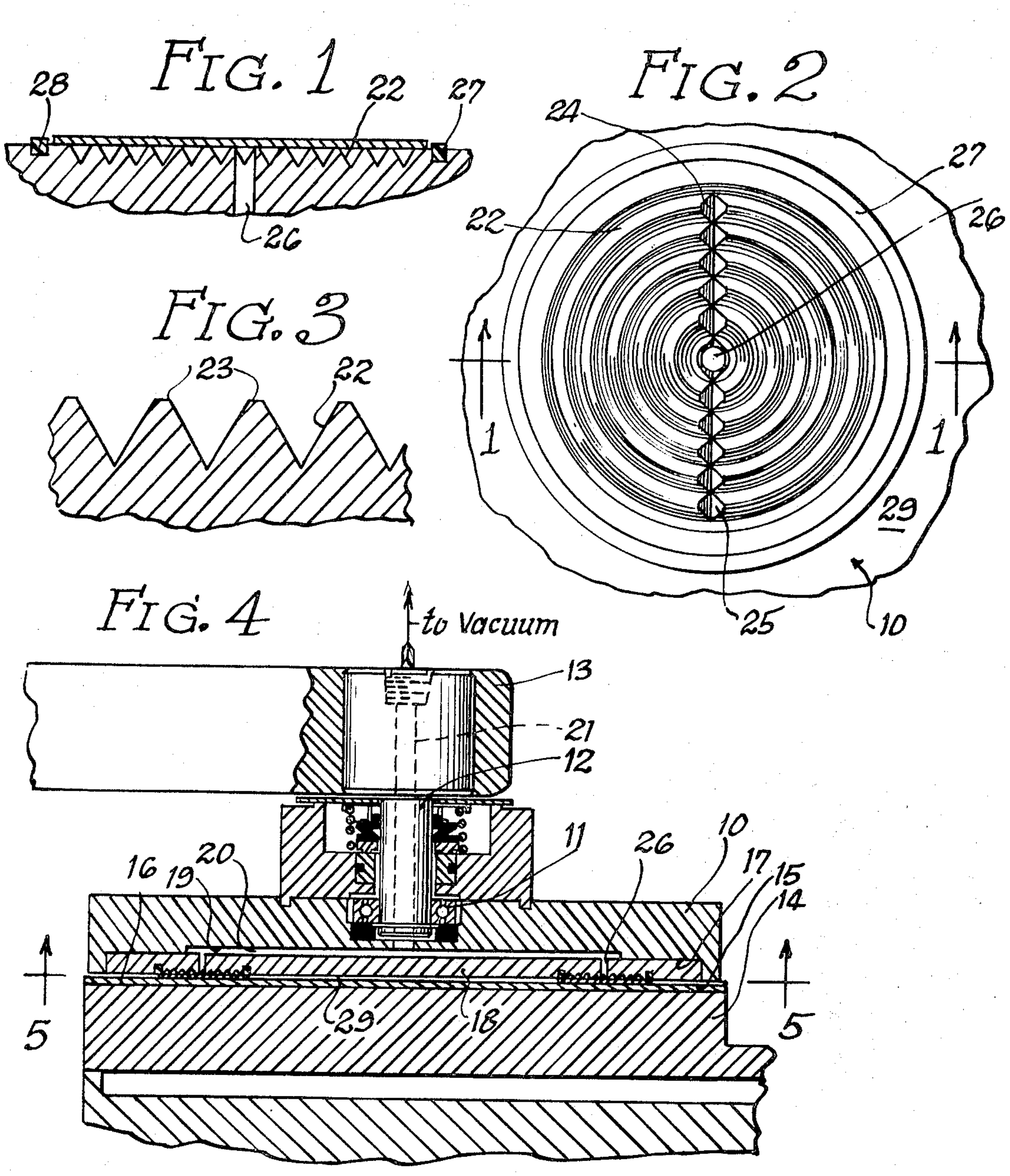
FIG. 2 is a plan view of the fixture fragment of FIG. 1.
FIG. 3 is an enlarged section through a portion of the holding means.
FIG. 4 is a section through the fixture showing the wafers in place on a polishing plate.

For ease of manufacture fixture 10 is hollowed out as shown at 17 in FIG. 4 by counterboring a short distance into the material of the fixture to form a disc-like recess into which is placed a disc 18 bearing the wafers proper. Said disc 18 has an exposed surface 29 to which the wafers are applied and which is a complementary surface to surface 16 of wheel 14. A second bore 19 is formed in fixture 10 of lesser diameter than counterbore 17 to form a space 20 between disc 18 and fixture 10 in the central regions of said fixture. Said space 20 is in communication with a central opening 21 in spindle 12 and central opening 21 is then connected through appropriate means, not shown, to a source of vacuum.

At the regions on disc 18 where the wafers are to be supported, disc 18 is formed with a plurality of concentric grooves, shown more clearly in FIGS. 1, 2 and 3 at 22. Although the specific shape of the groove is not material to this invention, a symmetrical V-type groove is preferred because of the ease with which it can be formed. Sufficient land 23 is left between the grooves to provide a flat surface against which a wafer may be held by the differential pressure created by the vacuum in the grooves 22. So that the vacuum pressure can be uniformly distributed throughout all of the grooves, said grooves are interconnected by radially disposed grooves 24 and 25 communicating with a central opening 26 connected directly to the space 20 which, as stated hereinabove, is in communication with a suitable source of vacuum.

In a typical embodiment designed for polishing wafers seven thousandths of an inch thick and approximately 1 ½ inches in diameter, grooves 22 are made with a 60° included angle and are forty-five thousandths of an inch deep. They are spaced radially from one another to leave ten thousandths of an inch for the radial dimension or width of land 23. The width of the grooves at the surface; that is, adjacent land 23 is fifty-two thousandths of an inch. For the same wafer the land width may vary from 0.008 to 0.012 in. and the groove width may vary from 0.050 to 0.054 in.

As may be apparent from the dimensions of the grooves, lands and wafer in the illustrative example given above, approximately 80 percent of the surface area of the wafer is exposed to the differential pressure created by the vacuum. These dimensions can vary by an amount which will decrease the groove area at the wafer by 5 percent and still produce satisfactory results.

To assist the operator in loading the wafers on fixture 10 in such manner that the center of the wafer will be directly over central opening 26, a confining ring 27 is used, said ring being disposed in a groove 28 formed concentrically with grooves 22. Ring 27 is preferably of square radial cross section and is made of polytetrafluoroethylene of such cross sectional dimension that the upper surface of the ring will be below the polished surface of a wafer. The internal diameter of the ring will be slightly greater than the diameter of the wafer.

Appropriate means (not shown) are used to elevate frame member 13 from wheel 14 and to invert the fixture so that at the time of loading, the surface of disc 18 bearing the grooves 22 is uppermost. The operator thus merely places a wafer within each of the rings 27 until all rings are filled.

Rings 27 are so proportioned relative to the dimensions of the groove 28 in which they are received that they are held in such grooves frictionally and hence remain in place regardless of the position of the fixture. Said rings 27 also perform a safety function. In the event that vacuum should fail, or decrease to the point where the frictional forces created by the polishing surface 15 tend to pull the wafers off the fixture, said wafers will be held in place by the rings 27. Although with the greatly increased total differential pressure created across the wafer by the grooves 22 the degree of vacuum actually needed to hold the wafers on the fixture may be decreased, it has been found that at times the wafers are not cut correctly so that they present a curved surface to the grooves. Such wafers could not be held by vacuum fixtures previously developed since the wafers did not effect a perfect seal with the fixture surface and hence insufficient total pressure could be generated to hold them in place. With the fixture of the present invention, however, by maintaining the same degree of vacuum as before, although ordinarily more than required, those which are formed with curved surfaces are nevertheless held because of the sufficiency of the total pressure for this purpose.

Thus although the wafer-supporting surface on the fixture is relieved over from 75 percent to 85 percent of its area, which is far more than is the case of known vacuum fixtures, the wafers are held firmly in place, without the creation of distortions in the finished polished wafer surface.

Although the fixture has been described with reference to its application to polishing operations upon silicon wafers it can be used with other workpieces. The greater holding power of the fixture adapts it for surface abrading operations such as lapping operations and in general for surface finishing or shaping operations requiring a more rapid stock removal than that which takes place in a polishing operation. It is understood therefore that the scope of the invention is not to be limited to the embodiment thereof illustrated herein, but is to be determined by the appended claims.

I claim:

1. A fixture for holding a thin workpiece while a surface of the workpiece is being abraded, said fixture comprising a rigid support having a surface of predetermined contour against which the said workpiece surface is adapted to be held, said fixture surface having concentric grooves formed therein separated by lands, said grooves having a width between lands in the range of 0.050 inch to 0.54 inch, said lands having a width in the range of 0.008 inch to 0.012 inch, and said workpiece having a thickness in the range of 0.003 inch to 0.008 inch, said workpiece being circular in form concentrically disposed over said grooves and extending beyond the last groove by approximately the width of a land, and means connecting the relieved portion of the fixture surface to a source of vacuum.

2. A fixture as described in claim 1, said fixture having further a groove concentric with the disc and of a diameter loosely to surround said disc, and removable means in said groove and extending above the surface of the fixture but below the upper surface of the wafer to be abraded and adapted to hold the wafer against lateral movement along the surface of the fixture while holding said wafer over said grooves.

3. A fixture as described in claim 2, said removable means comprising a ring of polytetrafluoroethylene frictionally held in said groove.

* * * * *